Aug. 12, 1924.
J. B. RAVIOLO
COMBINED WHEEL PULLER AND HUB CAP
Filed Feb. 2, 1922
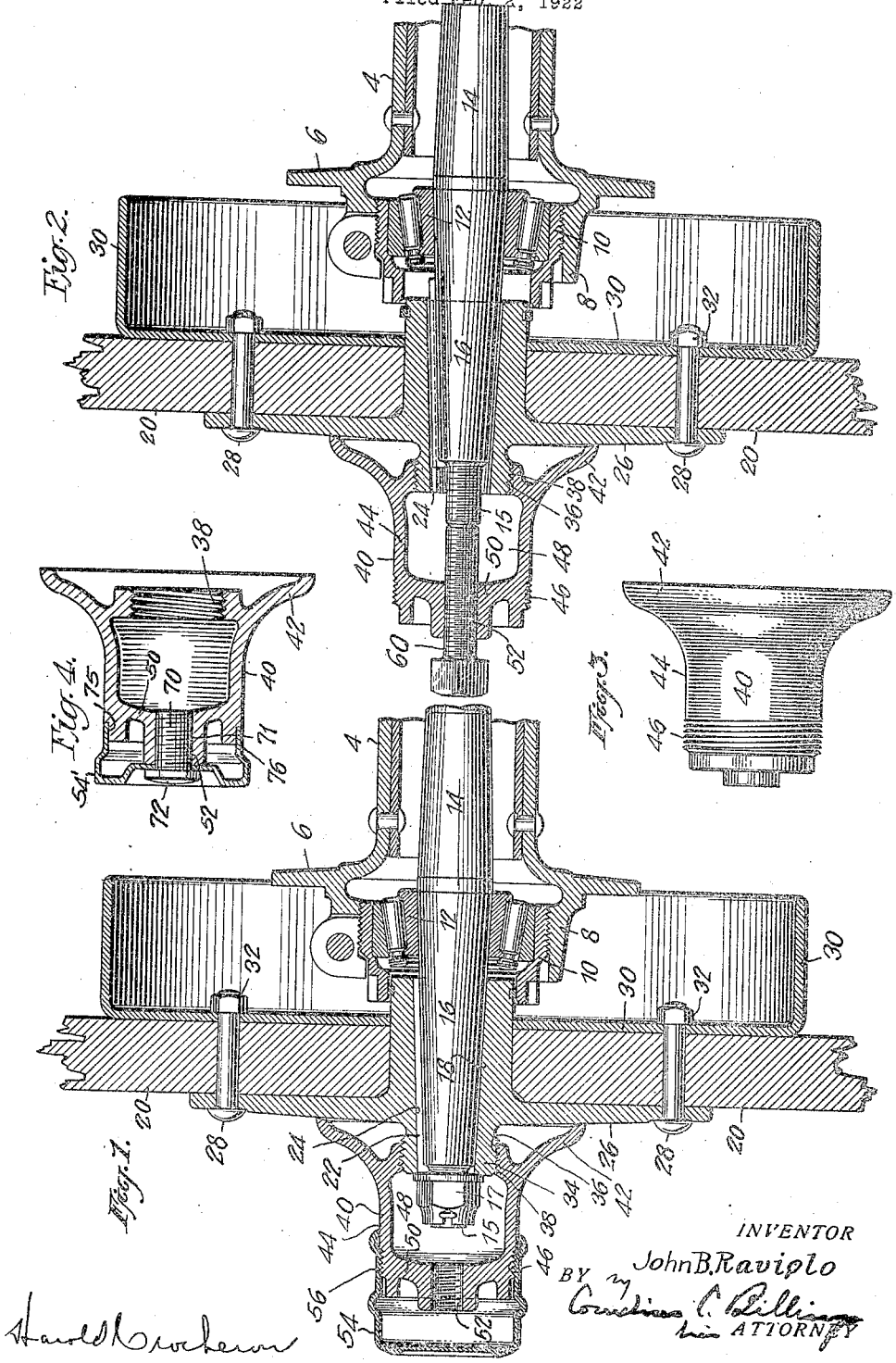
INVENTOR
John B. Raviolo
BY
ATTORNEY Patented Aug. 12, 1924.

1,504,784

UNITED STATES PATENT OFFICE.

JOHN B. RAVIOLO, OF NEW YORK, N. Y., ASSIGNOR TO DURANT MOTORS INCORPORATED, A CORPORATION OF DELAWARE.

COMBINED WHEEL PULLER AND HUB CAP.

Application filed February 2, 1922. Serial No. 533,537.

*To all whom it may concern:*

Be it known that I, JOHN B. RAVIOLO, a subject of the King of Italy, and a resident of the borough of Manhattan, city, county, and State of New York, have invented certain new and useful Improvements in Combined Wheel Pullers and Hub Caps, of which the following is a specification.

This invention relates to an improved wheel puller adapted to be carried by an automobile wheel and also designed to form an attractive hub cap support therefor.

The object of the invention is to provide a hub extension which will be efficient in use and attractive in appearance and at the same time may be utilized as a wheel puller when it is found necessary to dismount the wheel.

Other objects of the invention will be apparent from the following description when read in connection with the accompanying drawings forming a part thereof.

Fig. 1 is a longitudinal section of a portion of the rear axle of an automobile showing a portion of the rear wheel and associated parts.

Fig. 2 is a similar view showing the wheel partly withdrawn from the axle.

Fig. 3 is a side elevation of the combined wheel puller and hub extension detached from the wheel.

Fig. 4 is a modified construction of hub extension and cap.

In the drawings, 4 represents the rear axle housing which is flanged at 6 and provided with a boss 8 in which is secured by suitable screwthreads a retainer 10 which carries a roller bearing 12. The bearing 12 supports the outer end of the axle shaft 14 which is taper turned as shown at 16 to fit the bore of the hub 18 of the wheel 20. The axle shaft carries a key 22 which fits in a key seat 24 formed in said hub 18. The hub is provided with a radial flange 26 through which pass a number of bolts 28. These bolts pass through suitable holes in the spokes of the wheel 20 and through aligned holes in the wall of the brake drum 30, nuts 32 clamping the flange 26 and brake drum to the wheel, as shown.

The hub 18 is formed with an extension 34 which is provided with screwthreads 36 which engage similar threads 38 formed on the combined wheel puller and hub extension 40. The extension 40 is formed with a flared flange 42 which bears against the flange 26 of the wheel hub, and said hub extension is provided with a projection 44 which may be externally threaded at 46 to receive a hub cap, as shown in Fig. 1, and is further formed with an inner chamber 48 and a bridge portion 50 having an extended boss integral therewith which is internally threaded at 52. A sheet metal hub cap or cover 54 fits over the outer end of the projection 44 and is provided with threads 56 which engage the threads 46 on the exterior of said hub extension 40.

The outer end of the axle shaft 14 terminates in a threaded shank 15 to which a nut 17 is secured to hold the wheel and hub firmly on the tapered end of the axle.

The normal position of the parts is shown in Fig. 1 in which it will be seen that the hub extension 40 covers the nut 17 and shank 15 of the axle shaft and makes a neat finished appearance.

When it is desired to remove the wheel from the axle shaft the rear end of the car is jacked up and the hub cap 54 is removed from the hub extension 40, then the latter is unscrewed from the hub 34 of the wheel so that the nut 17 can be removed from the shank 15. This having been accomplished, the hub extension 40 is again screwed onto the hub 34 as shown in Fig. 2, and a bolt 60 is threaded through the bridge portion 50 of the hub extension 40. When the end of the bolt 60 engages the end of the shank 15 a wrench is applied to the end of said bolt 60 so that great pressure can be exerted to withdraw the wheel from the tapered end of the axle shaft. It is only necessary to start or unseat the tightly engaging parts to allow the ready removal of the wheel. A short bolt 60 sufficiently long to exert such starting or unseating movement could readily be carried in place in the bridge 50 and enclosed by the cover 54, but usually the bolt 60 will be carried in the tool box of the car. The threads 52 are of standard size so that the proper size of bolt can be readily secured in case the original is misplaced or lost.

In Fig. 4 is shown a modified construction in which the cap 54' is fitted to the extension 40 and held in place by means of a screw bolt 70, the screwthreaded shank 71 of which engages with the screwthreads 52 in the bridge portion 50 of the extension 40. The bolt 70 is provided with a suitably shaped head 72 which is preferably hexagonal so that it can be easily gripped by a wrench in order to turn the same. By means of this modified construction the outer edge of the extension 40 need not be provided with screwthreads but need only be provided with a seat 75 for the reception of the flange 76 of the cap 54'.

Modifications in the details of construction and changes of arrangement may be made without departing from the invention as defined in the appended claims.

Having thus described my invention what I claim as new and desire to secure by Letters Patent is:

1. A wheel hub extension element normally mounted upon and carried by the wheel, the said element being provided at one end with means for removably securing the same to the wheel and also with a flange surrounding the said securing means, the edge of the flange being adapted to contact with the side of the wheel when in place to simulate an extended hub, and provided at its opposite end with a removably mounted cap, said extension element also having a bridge portion, said bridge portion being provided with a centrally disposed screwthreaded perforation in line with the wheel axle when the said extension element is in place on the wheel.

2. A wheel hub extension element normally mounted upon and carried by the wheel, the said element being provided at one end with means for removably securing the same to the wheel and also with a flange surrounding the said securing means, the edge of the flange being adapted to contact with the side of the wheel when in place to simulate an extended hub, said extension element also having a bridge portion, said bridge portion being provided with a centrally disposed screwthreaded perforation in line with the wheel axle when the said extension element is in place on the wheel.

In witness whereof I have hereunto set my hand at Long Island City, county of Queens, State of New York, this 27th day of January, 1922.

JOHN B. RAVIOLO.